United States Patent [19]
Yamaguchi

[11] Patent Number: 5,264,929
[45] Date of Patent: Nov. 23, 1993

[54] VIDEO SWITCHER

[75] Inventor: Toshiyuki Yamaguchi, Tokyo, Japan

[73] Assignee: Sony Corporation, Japan

[21] Appl. No.: 807,722

[22] Filed: Dec. 16, 1991

[30] Foreign Application Priority Data

Dec. 28, 1990 [JP] Japan .................. 2-417438
Dec. 28, 1990 [JP] Japan .................. 2-417444

[51] Int. Cl.$^5$ .............................................. H04N 7/18
[52] U.S. Cl. ................................. 358/108; 358/181
[58] Field of Search ................ 358/108, 181, 142, 141

[56] References Cited

U.S. PATENT DOCUMENTS

| | | | |
|---|---|---|---|
| 3,898,644 | 8/1975 | Baxter | 358/108 |
| 4,218,709 | 8/1980 | Baxter et al. | |
| 4,511,886 | 4/1985 | Rodriguez | 358/108 |
| 4,700,230 | 10/1987 | Pshtissky et al. | |
| 4,814,869 | 3/1989 | Oliver, Jr. | 358/108 |
| 4,943,864 | 7/1990 | Elberbaum | |
| 4,992,866 | 2/1991 | Morgan | 358/108 |

OTHER PUBLICATIONS

Bose, Keith W. "Video Security Systems" Butterworth Publishers 1982 pp. 105-121.

Primary Examiner—James J. Groody
Assistant Examiner—David E. Harvey
Attorney, Agent, or Firm—Ronald P. Kananen

[57] ABSTRACT

A video signal switching apparatus having a change-over switch for selectively outputting video signals supplied from a plurality of video signal sources, wherein when a first switching mode is designated, then a plurality of video signals supplied from a plurality of video signal sources to first and second input terminal groups are sequentially output in accordance with a predetermined output order and when a second switching mode is designated, then video signals supplied from the plurality of video signal sources to the first input terminal group are sequentially output in a predetermined output order and simultaneously video signal supplied from the plurality of video signal sources to the second input terminal group are sequentially output in a predetermined output order.

4 Claims, 4 Drawing Sheets

FIG. 4

| Status Data | | } 100 Bytes |
|---|---|---|
| Timer Clock Data 1 | Address | |
| Timer Clock Data 2 | Address | |
| Timer Clock Data 3 | Address | |
| Timer Clock Data 4 | Address | |
| Timer Clock Data 5 | Address | |
| Timer Clock Data 6 | Address | |
| Timer Clock Data 7 | Address | |
| Timer Clock Data 8 | Address | |
| Setting Data 1 | | |
| Setting Data 2 | | |
| Setting Data 3 | | |
| Setting Data 4 | | 800 Bytes |
| Setting Data 5 | | |
| Setting Data 6 | | |
| Setting Data 7 | | |
| Setting Data 8 | | |

VIDEO SWITCHER

BACKGROUND OF THE INVENTION

1. Field of the Invention

The present invention generally relates to video signal switching apparatus and, more particularly, is directed to a video signal switching apparatus for use in a switching apparatus which switches monitor or supervisory video cameras.

2. Description of the Related Art

Japanese Laid-Open Patent Publication No. 62-142489, for example, describes a supervisory apparatus employing a video camera. In this kind of supervisory apparatus, if supervisory video cameras are installed at a plurality of places, then it is proposed that pictures of the supervisory places are monitored by monitor receivers the number of which corresponds to that of the supervisory video cameras. In this case, however, with the increase of the places to be monitored, the number of the video cameras and that of monitor receivers are increased, which as a result makes the supervisory system complicated in arrangement. Further, if a video signal from a supervisory video camera is recorded on a video tape recorder (VTR) instead of the monitor receiver, there is then the disadvantage that the number of VTRs is increased with the increase of the places to be monitored, which also makes the supervisory system complicated in arrangement.

To avoid these disadvantages, a video signal switching apparatus for a supervisory camera is now commercially available on the market, in which video signals supplied from supervisory video cameras installed on a plurality of supervisory places are selectively switched and supplied to a single monitor receiver.

In this video signal switching apparatus for supervisory cameras, video signals from a plurality of supervisory video cameras connected thereto are sequentially switched at a predetermined interval and then fed to the single monitor receiver. If this video signal switching apparatus is utilized, then the user can monitor all places by a supervisory picture displayed on the picture screen of a single monitor receiver, which simplifies the arrangement of the supervisory system and which makes it possible for the user to carry out the monitoring with ease. Further, when the video signals from the supervisory video cameras are recorded on the VTR, these video signals can be efficiently recorded on the single VTR by utilizing this video signal switching apparatus.

Incidentally, if pictures of a plurality of places to be monitored are sequentially displayed by utilizing this video signal switching apparatus, i.e., if pictures of eight supervisory video cameras are repeatedly and sequentially displayed one second each, then it takes eight seconds for the user to monitor pictures of all supervisory cameras. There is then the disadvantage that the respective places are monitored only during one second at every eight seconds. In order to eliminate this disadvantage, the following proposal is made:

Two video signal switching apparatus and two supervisory receivers are respectively prepared, a plurality of supervisory cameras are divided into two systems, the supervisory cameras of one system are connected to one video signal switching apparatus, the supervisory cameras of the other system are connected to the other video signal switching apparatus and separate monitor receivers are connected to respective video signal switching apparatus. With the above-mentioned arrangement, eight supervisory cameras, for example, are divided into two systems at every four supervisory cameras and pictures of the respective supervisory cameras are switched at every second by the respective video signal switching apparatus, whereby pictures of the respective supervisory cameras are displayed during one second each at every four seconds by the two monitor receivers. Accordingly, the places to be monitored can be monitored at the cycle (frequency) of ½ as compared with the case such that the single video signal witching apparatus is utilized.

However, if the places are monitored by the two supervisory systems as described above, two video signal switching apparatus are needed, which unavoidably makes the supervisory system complicated in arrangement.

Furthermore, this kind of supervisory camera video signal switching apparatus is frequently utilized at night in an automated fashion. In this case, although it is proposed that pictures switched by the video signal switching apparatus are recorded by the VTR, the user frequently wants to change the places to be monitored depending upon the day of the week and the time. When the place to be monitored is changed, or when the picture switched by the switching apparatus is changed, then the user must operate the switching apparatus so that the setting conditions such as the switching conditions or the like cannot be changed during the supervisory system is operated in an automated fashion.

OBJECTS SUMMARY OF THE INVENTION

Accordingly, it is an object of the present invention to provide an improved video signal switching apparatus in which the aforementioned shortcomings and disadvantages encountered with the prior art can be eliminated.

More specifically, it is an object of the present invention to provide a video signal switching apparatus of a simple arrangement which can switch a plurality of systems simultaneously.

Another object of the present invention is to provide a video signal switching apparatus in which a switching operation state can automatically be switched on the basis of predetermined switching data.

In accordance with a first aspect of the present invention, a video signal switching apparatus having a change-over switch for selectively outputting video signals supplied from a plurality of video signal sources is comprised of a mode setting circuit for selectively outputting a signal indicative of a first mode in which a plurality of video signals supplied from the plurality of video signal sources are sequentially output in accordance with a predetermined order and a signal indicative of a second mode in which a plurality of video signals supplied from the plurality of video signal sources are divided into first and second groups and a plurality of video signals within each of the divided groups are sequentially output in accordance with a predetermined order, a memory for storing data indicating the predetermined output order of the plurality of video signals, and a controller for controlling the change-over switch on the basis of an output signal of the mode setting circuit and an output signal of the memory, wherein the controller controls the change-over switch such that, when the signal indicative of the first mode is supplied thereto from the mode setting circuit, a plurality of video signals supplied from the plurality of video signal sources to first and second input terminal groups of the change-over switch are sequentially output in accordance with the predetermined output order and that, when the signal indicative of the second mode is supplied thereto from the mode setting circuit, video signals supplied to the first input terminal groups of the change-over switch from the plurality of video signal sources are sequentially output in accordance with the predetermined output order and simultaneously video signals supplied to the second input terminal groups of the change-over switch from the plurality of video signal sources are sequentially output in accordance with the predetermined output order.

As a second aspect of the present invention, a video signal switching apparatus having a change-over switch for selectively outputting video signals supplied from a plurality of video signal sources is comprised of a mode setting circuit for selectively outputting a signal indicative of a first mode in which a plurality of video signals supplied from the plurality of video signal sources are sequentially output in accordance with a predetermined order and a signal indicative of a second mode in which a plurality of video signals supplied from the plurality of video signal sources are divided into first and second groups and a plurality of video signals within each of the divided groups are sequentially output in accordance with a predetermined order, a memory for storing data indicating the predetermined output order of the plurality of video signals, and a controller for controlling the change-over switch on the basis of an output signal of the mode setting circuit and an output signal of the memory, wherein the controller controls the change-over switch such that, when the signal indicative of the first mode is supplied thereto from the mode setting circuit, a plurality of video signals supplied from the plurality of video signal sources to the first and second input terminal groups of the change-over switch are sequentially output from the first and second output terminals in accordance with the predetermined output order and that, when the signal indicative of the second mode is supplied thereto from the mode setting circuit, video signals supplied to the first input terminal groups of the change-over switch from the plurality of video signal sources are sequentially output from the first output terminal in accordance with the predetermined output order and simultaneously video signals supplied to the second input terminal groups of the change-over switch from the plurality of video signal sources are sequentially output from the second output terminal in accordance with the predetermined output order.

The preceding and other objects, features, and advantages of the present invention will become apparent from the following detailed description of an illustrative embodiment thereof to be read in conjunction with the accompanying drawings, in which like reference numerals are used to identify the same or similar parts in the several views.

BRIEF DESCRIPTION OF THE DRAWINGS

FIG. 4 is a diagram showing one portion of data stored in the video signal switching apparatus shown in FIG. 1.

DETAILED DESCRIPTION OF THE PREFERRED EMBODIMENT

An embodiment of the video signal switching apparatus according to the present invention will now be described with reference to the drawings.

Figure 1:
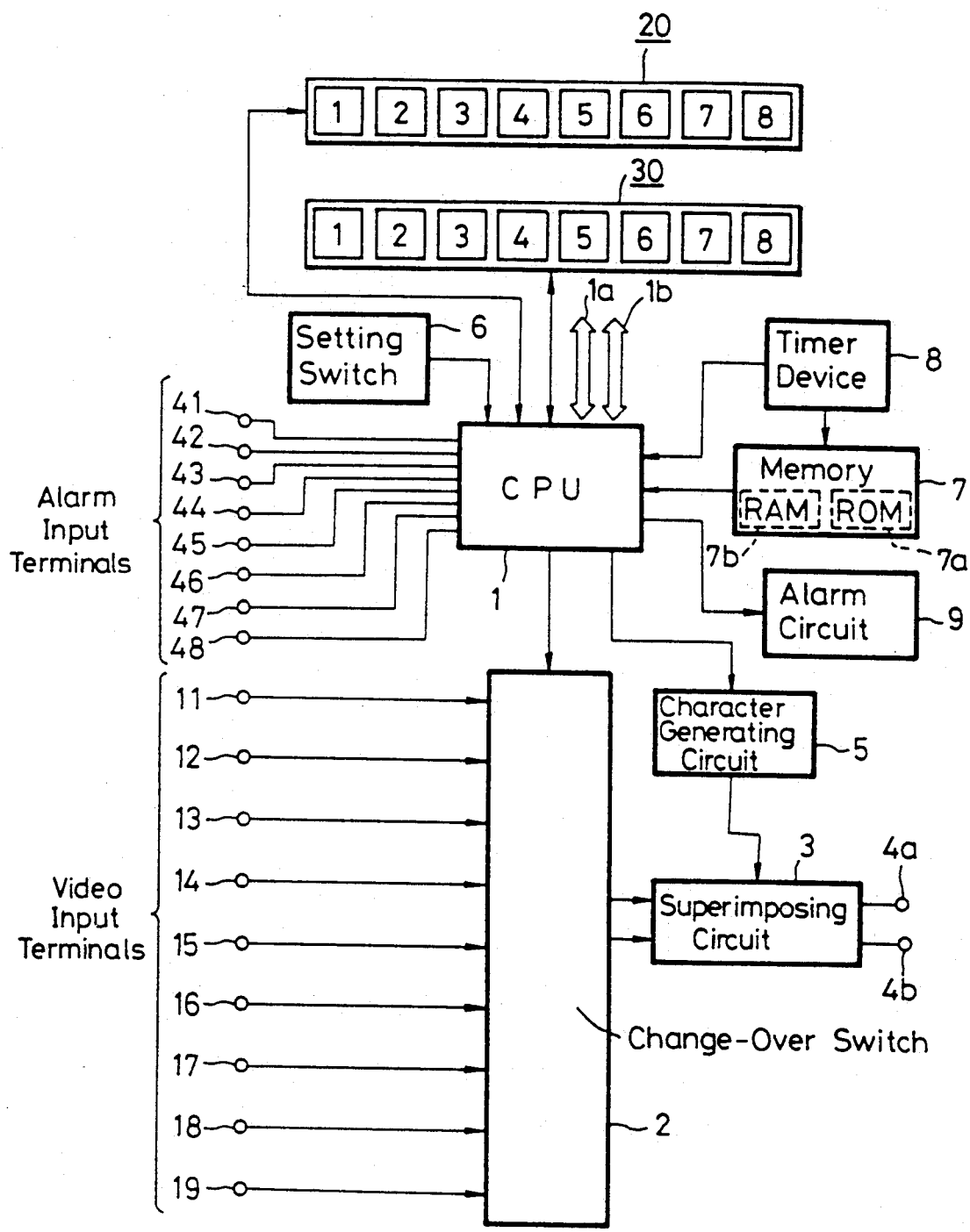
FIG. 1 is a block diagram showing an embodiment of a video signal switching apparatus according to the present invention.

FIG. 1 shows in block form an overall arrangement of the embodiment of the video signal switching apparatus according to the present invention. This video signal switching apparatus is used to switch output video signals from supervisory video cameras. As shown in FIG. 1, a central processing unit (CPU) 1 is formed of a microcomputer and is adapted to control respective circuits of the video signal switching apparatus according to the present invention. The switching operation of a change-over switch 2 for switching a video signal is carried out under the control of this CPU 1. More specifically, a program for executing the switching operation or the like is stored in advance in a memory device 7 connected to the CPU 1 and this memory device 7 will be described more fully later. When supplied with a variety of instructions issued by the key operation or the like, the CPU 1 causes the change-over switch 2 to perform the switching operation or the like on the basis of the program stored in the memory device 7. In this case, the change-over switch 2 is designed so as to perform the switching processing of two systems at the same time. In FIG. 1, reference numerals 11, 12, 13, . . . 19 designate first to ninth video input terminals to which there are supplied video signals from supervisory video cameras, respectively. In this case, at maximum, eight supervisory video cameras are connected to the first to eighth input terminals 11 to 18. The ninth input terminal 19 is used to connect a plurality of video signal switching apparatus or the like and is not utilized in the normal mode.

Video signals applied to the video input terminals 11, 12, 13, . . . 19 from respective video cameras are supplied to the change-over switch 2 and the change-over switch 2 derives a video signal from the camera or the like selected under the control of the CPU 1. Under the control of the CPU 1, the change-over switch 2 can carry out the switching operation in the automatic switching mode in which the switching operation is performed automatically at a predetermined cycle in the preset order, in the manual switching mode in which the switching operation is carried out on the basis of the key operation, and in the forced switching mode in which the switching operation is carried out on the basis of the input such as an alarm signal or the like which will be described later.

In this embodiment, when the switching operation is carried out under the control of the CPU 1, then the switching operation is carried out during the vertical blanking period of the video signals applied to the respective input terminals 11 to 19. That is, if the switching operation of the input video signal must be carried out, the CPU 1 does not derive a switching signal until the vertical blanking period of the video signal supplied.

Input timings of the vertical blanking signals of the video signals applied to the respective input terminals 11 to 19 are set to be the same by utilizing a synchronizing (SYNC) signal generator 61 (FIG. 2) which will be described later. Further, when the change-over switch 2 carries out the switching operation of the two systems simultaneously in the automatic switching mode, then the CPU 1 controls the change-over switch 2 in such a manner that the output video signals of these two systems are switched at the same switching timing.

The video signal selected by the change-over switch 2 is supplied through a superimposing circuit 3 to an output terminal 4a or 4b. Outputs to the two output terminals 4a and 4b are selected by the CPU 1. That is, in the normal mode, the same switched video signal is supplied to the two output terminals 4a and 4b, and video signals from different video input terminals are supplied to the two output terminals 4a and 4b only in the two-system switching mode which will be described later. By connecting a monitor receiver and a video tape recorder (VTR) to the output terminals 4a and 4b, a picture of a place to be monitored can be displayed by the monitor receiver and a picture of the place to be monitored can be recorded by the VTR.

Figure 2:
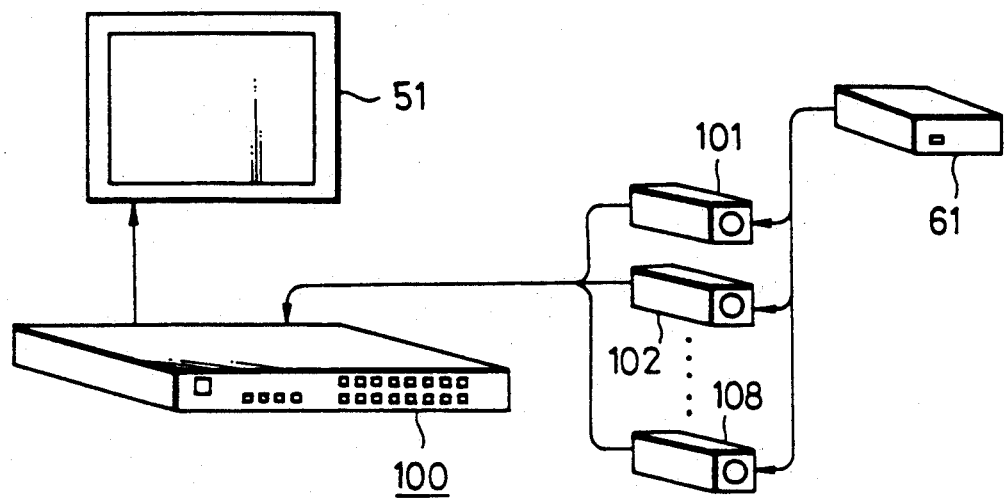
FIG. 2 is a schematic diagram used to explain the connection between the video signal switching apparatus shown in FIG. 1 and external appliances.

An example of an arrangement of a supervisory system utilizing this video signal switching apparatus will be described with reference to FIG. 2. In FIG. 2, reference numeral 100 designates a video signal switching apparatus according to this embodiment. Eight supervisory video cameras 101 to 108 are connected to the video input terminals 11 to 18 of this video signal switching apparatus 100 and the output video signal developed at the output terminal 4a is supplied to a monitor receiver 51, whereby pictures taken by the respective video cameras 101 to 108 are displayed on the monitor receiver 51 in a predetermined order. The same SYNC signal is supplied to the respective video cameras 101 to 108 from the SYNC signal generator 61 so that the video cameras 101 to 108 generate video signals in which output timings of the vertical SYNC signals are coincident.

Figure 3:
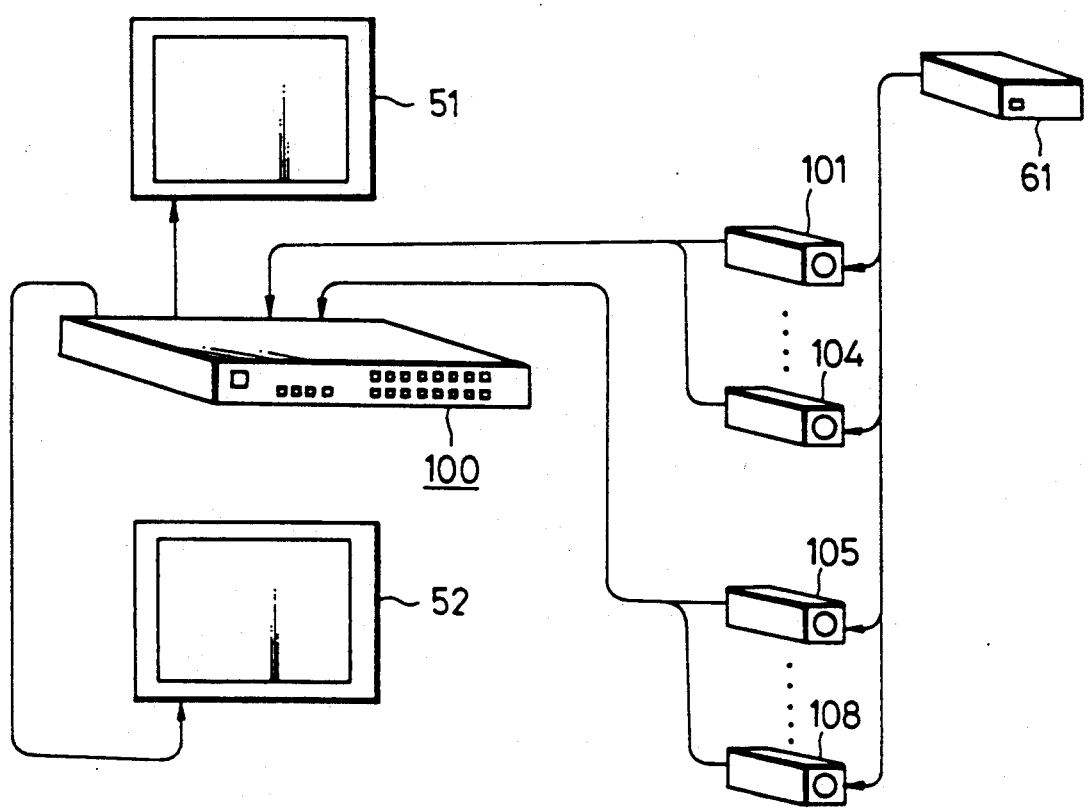
FIG. 3 is a schematic diagram used to explain operation of the video signal switching apparatus shown in FIG. 1.

When the video signal switching apparatus of this embodiment is set in the two-system switching mode, then the switching operation is carried out in the separated form of two systems which is comprised of the switching system with respect to the first to fourth video input terminals 11 to 14 and also with respect to the fifth to eighth video input terminals 15 to 18 of the video input terminals 11 to 18 of the video signal switching apparatus 100. Accordingly, as shown in FIG. 3, of the eight supervisory video cameras 101 to 108 connected to the video input terminals 11 to 18 of the video switcher 100, the switching operation of the first system is carried out with respect to the video cameras 101 to 104 connected to the first to fourth video input terminals 11 to 14 and the switching operation of the second system is carried out with respect to the video cameras 105 to 108 connected to the fifth to eighth video input terminals 15 to 18. Then, the video signal switched in the first system is supplied to a monitor receiver 51 connected to the output terminal 4a and the video signal switched in the second system is supplied to a monitor receiver 52 connected to the output terminal 4b. If the switching of the two separate systems is carried out in the automatic switching mode, then the switching operations are carried out at the same timing in unison with each other in the two systems. That is, when the video signal applied to the first video input terminal 11 is supplied to the monitor receiver 51 in the first system, then the video signal applied to the fifth video input terminal 15 is supplied to the monitor receiver 52 in the second system. Similarly, when the second, third and fourth video input terminals 12, 13 and 14 are switched in the first system, then the sixth, seventh and eighth video input terminals 16, 17 and 18 are switched in the second system at the same time.

Referring back to FIG. 1, a character generating circuit 5 includes a memory (not shown) which stores therein character data such as characters, symbols or the like. Character data stored in the memory of the character generating circuit 5 are read out under the control of the CPU 1 and then fed to the superimposing circuit 3. Then, the character data supplied to the superimposing circuit 3 are superimposed upon the video signals supplied from the change-over switch 2 and the video signals having the character data superimposed thereon are supplied to the output terminals 4a and 4b. As the character data superimposed upon the video signals, there are available numerals indicating a selected camera number, date, characters indicating setting situations of various operation modes, or the like. When the same video signal is output to the output terminals 4a and 4b, the same character data is superimposed on the video signal by the superimposing circuit 3, while when the different input video signals are output to the output terminals 4a and 4b, then character data such as camera numbers or the like corresponding to the video signals fed to the output terminals 4a and 4b are superimposed upon the video signals by the superimposing circuit 3.

Further, in FIG. 1, reference numeral 20 depicts an input selecting switch and reference number 30 refers to an active switch. Each of the switches 20 and 30 is composed of eight switches or first to eighth switches corresponding to eight video cameras connected to the video input terminals 11 to 18. The switches 20 and 30 are mounted on the front panel of this video signal switching apparatus and operation instructions from the respective switches 20 and 30 are supplied to the CPU 1. In this case, the respective switches 20 and 30 can be individually turned on under the control of the CPU 1.

By operating the input selecting switch 20, the user can access the video camera (input terminal) selected by the change-over switch 2 and at that time, the CPU 1 energizes a light emitting source (not shown) provided within the switch of the serial number corresponding to the video camera now selected. Further, by operating the active switch 30, the user can access the video camera selected in the automatic switching mode and at that time, the CPU 1 energizes a light source (not shown) provided within the switch of the serial number corresponding to the video camera selected.

Data concerning the video camera selected in the automatic switching mode by means of the active switch 30 is stored in a random access memory (RAM) 7b, which will be described later, in the memory device 7 under the control of the CPU 1. When the operation of the automatic switching mode is controlled by the CPU 1, then the status of the switch placed in the active state is determined by the CPU 1 on the basis of the data stored in the RAM 7b, and only the video signal developed at the input terminal (any of the video input terminals 11 to 18) corresponding to the switch set in the active state is sequentially selected by the change-over switch 2.

Further, in FIG. 1, reference numeral 6 depicts a setting switch. This setting switch 6 is composed of a plurality of keys or the like and operation instructions issued by the respective keys are supplied to the CPU 1. The setting switch 6 might be mounted either on the front panel together with the switches 20 and 30 or on the rear surface in the form of a dip switch or the like. In this case, the setting of a variety of modes under the control of the CPU 1 or the like is performed by operating these keys. When various modes are set, then the setting contents may be visually confirmed on the picture displayed on the picture screen of the monitor receiver connected to the video switcher of this embodiment. More specifically, when various modes are set, the character data from the character generating circuit 5 are superimposed upon the video signals by the superimposing circuit 3 so that the information such as characters, numerals, and soon indicative of the setting conditions or the like are involved in the video signals output from the output terminals 4a and 4b. The setting work done by the setting switch 6 might be the setting work which enables this video signal switching apparatus to become operable in the two systems, for example.

The CPU 1 is connected with the memory device 7 and this memory device 7 is composed of a read only memory (ROM) 7a from which there is read out only data such as main program or the like stored in advance and the RAM 7b in which stored data can be rewritten. The ROM 7a can be exchanged and the RAM 7b includes a backup power supply (not shown) which can prevent stored data from being lost.

Further, a timer device eight is connected to the CPU 1, and present clock data counted by this timer device eight is supplied to the CPU 1 and the memory device 7. In this case, on the basis of the present clock data supplied to the CPU 1, character data of numerals indicative of date and time are superimposed upon the output video signal by the superimposing circuit 3. Further, when a so-called timer operation for changing the operable condition (switching condition) dependent on time is executed, then a predetermined timer operation is carried out on the basis of the present clock data supplied to the CPU 1 under the control of the CPU 1. The present time data supplied to the memory device 7 can be stored in the RAM 7b by the instruction from the CPU 1. That is, when some data (i.e., data concerning the supply of an alarm signal which will be described later) is stored in the RAM 7b, data indicative of time at which the above data is stored may also be stored therein.

Further, in FIG. 1, reference numerals 41, 42, 43, . . . 48 depict first to eighth alarm input terminals. The alarm input terminals 41 to 48 correspond with the eight video cameras coupled to the first to eighth video input terminals 11 to 18 and are supplied with alarm signals from sensors (infrared sensors or the like) which are located at the supervisory places of the supervisory video cameras so as to detect the entrance of those who are not allowed to enter. The alarm signals developed at the input terminals 41 to 48 are supplied to the CPU 1. When the alarm signal is supplied to the CPU 1, then the video signal from the video camera corresponding to the serial number of the terminal to which the alarm signal is supplied is selected by the change-over switch 2 and then output, and data concerning the serial number of the terminal to which the alarm signal is supplied and the time thereof are stored in the RAM 7b. An alarm circuit 9 is coupled to the CPU 1 and this alarm circuit 9 is composed of a speaker and an alarming lamp, though not shown. When the alarm signal is supplied to the alarm circuit 9, then an alarming sound is emanated from the speaker and the alarming lamp also is blinked. In that event, the alarming sound is emanated and the alarming lamp is blinked either during a preset time period (e.g., 10 seconds, 30 seconds, one minute or the like) or until the alarm releasing operation is performed.

In the automatic switching mode of the two systems, under the control of the CPU 1, only the system to which the video input terminal (video camera) corresponding with the alarm input terminal to which the alarm signal is supplied belongs is set in the forced switching mode in which this video input terminal is selected by the change-over switch 2, and for the other system, the switching operation according to the automatic switching mode is continued.

Further, in accordance with the video signal switching apparatus of this embodiment, time data selected can be set at every video input terminal to be switched by the change-over switch 2 in the automatic switching mode where the automatic switching is carried out by performing a predetermined operation as the switching time selecting mode.

Operation of the video signal switching apparatus according to this embodiment will be described below.

Initially, let it be assumed that the mode in which the switching is automatically performed at every second is selected by operating, for example, the setting switch 6. Then, the CPU 1 determines the status of the active switch 30 and hence determines the video input terminal (any of the video input terminals 11 to 18) which is set in the active state. In the following description, let us assume that eight supervisory video cameras are respectively connected to the video input terminals 11 to 18 as shown in FIG. 2.

When all video cameras are set in the active state, the video signals from the video cameras connected to all the video input terminals 11 to 18 are sequentially supplied from the output terminal 4a to the monitor receiver. Initially, the change-over switch 2 is changed in position such that the video signal from the video camera coupled to the first video input terminal 11 is output from the output terminal 4a. At that time, the input selecting switch 20 corresponding to the video input terminal 11 is energized. After a predetermined time (one second is set in all of the following cases)preset by the setting work of the above-mentioned switching time is elapsed since the above video signal has output from this video camera, the change-over switch 2 is changed in position such that the video signal from the video camera coupled to the second video input terminal 12 is output from the output terminal 4a. At that time, the input selecting switch 20 corresponding to this video input terminal 12 is energized. Similarly, the change-over switch 2 is changed in position such that the video signals developed at the video input terminals 13, 14, . . ., 18 are output from the output terminal 4a at every second, and the input selecting switches 20 corresponding to the respective switchings are energized. If one second is passed after the video signal from the video input terminal 18 is selected, the change-over switch 2 is changed in position such that the video signal obtained at the video input terminal 11 is again output from the output terminal 4a. Accordingly, the video signals from the eight video cameras are repeatedly and sequentially output. In this fashion, the video signals from the eight video cameras are switched and then output from the output terminal 4a at every second, whereby the video signals from the respective video cameras are sequentially displayed on the monitor receiver at every second in the cycle of eight seconds.

Therefore, up to eight places can be monitored by the single monitor receiver (or the VTR) and many places can be monitored by a supervisory system having a lesser appliances.

In this embodiment, as shown in FIG. 3, by connecting the two monitor receives 51 and 52 to the video signal switching apparatus 100, the eight video cameras can be divided into the two systems by operating the setting switch 6 so as to monitor the monitoring places. In that event, in the automatic switching mode in which all the video cameras are set in the active state, video cameras 101 to 104 connected to the first to fourth video input terminals 11 to 14 are sequentially switched in unison with the sequential switching of the video cameras 105 to 108 connected to the fifth to eighth video input terminals 15 to 18 so that, when each of the switching time periods is set to be one second, the video signals from the respective video cameras are sequentially displayed on the two monitor receivers 51 and 52 at every second in the cycle of 4 seconds. Accordingly, as compared with the case such that the switching is performed in one system, the monitoring can be carried out in the half cycle so that the opportunity for monitoring respective places can be increased twice, thus making it possible to perform efficient monitoring. Incidentally, even when the monitoring is performed in the divided form of two systems, the video cameras switched in the automatic switching mode can be selected in the respective systems by operating the active switch 30, thereby preventing the video signal from the unnecessary video camera from being displayed. Further, even when the monitoring is performed in the divided form of the two systems, if the video switcher is placed in the manual switching mode, then the places monitored can be separately selected by operating the input selecting switch 20.

When the video signal switching apparatus of this embodiment is operated both in the one system and the two systems, so long as the monitoring is performed by this video signal switching apparatus, it is determined on the basis of the energized state of each of the input selecting switch 20 of the video signal switching apparatus, a particular video camera whose video signal is being displayed. Further, the input number is displayed on the corner of the picture displayed on the monitor receiver by superimposing the character data on the input number (or the set camera ID number) by the superimposing circuit 3. It can be determined on the basis of the input number displayed a particular video camera whose video signal is displayed. Accordingly, when the video signal switched by, for example, the video signal switching apparatus is recorded by the VTR and when the rooms to be monitored are not identified by the pictures thereof because the respective rooms to be monitored are substantially identical rooms, the recorded pictures of the places to be monitored can be identified by the input numbers displayed. Further, since the character data are also superimposed upon the pictures together with the input numbers, it is possible to determine the time of picture taken when recorded by the VTR.

If any input selecting switch 20 is depressed in the automatic switching mode, then the picture is switched to a picture based on a video signal applied to the video input terminal of the input number corresponding to the input selecting switch 20 thus depressed. If the same input selecting switch 20 is depressed again, then the switching mode is returned to the automatic switching mode in which the switching is carried out at every predetermined time. Accordingly, when the monitoring is performed in the automatic switching mode, a particular monitoring place can be temporarily monitored with a priority.

If there is no place to be monitored, then the active switch 30 corresponding to the video camera installed on the unnecessary place is placed in the non-active state so that the video signal from that video camera is not displayed, which is particularly suitable for the case such that the monitored place must be changed, for example, with time. In that case, a video camera, which is placed in the non-active state during a predetermined time, can be set in advance by a timer function, which is very convenient.

Further, when the alarm signal is supplied to any of the alarm input terminals 41 to 48 of the video signal switching apparatus in the automatic switching mode, then the automatic switching operation is temporarily stopped and the video signal from the video camera corresponding to the serial number of the terminal to which the alarm signal is supplied is selected by the change-over switch 2 and then output. Also, the serial number of the terminal to which the alarm signal is supplied and the time data thereof are stored in the RAM 7b. Further, depending on the set operation mode, an alarming sound is emanated from the speaker during a predetermined time and the alarming lamp is blinked during a predetermined time. Accordingly, infrared sensors, for example, are located at respective monitoring places and the alarm signals from the infrared sensors are supplied to the alarm input terminals 41 to 48 of the video signal switching apparatus so that, when someone enters each of the places to be monitored, then the picture of the place to be monitored that someone enters is displayed on the monitor receiver and the entrance of a stranger is alarmed by the alarming circuit 9. Thus, even if someone enters the monitoring place during a time when the picture of other monitoring place is displayed, then the user never misses the stranger; thereby, the monitoring is made reliably. If the monitoring place is not monitored by the monitor receiver in a real time fashion but if a monitoring place in which nobody stays at night is monitored by the VTR, then the entrance of the stranger can be understood from data (data of place and time in which someone enters) stored in the memory device 7 later. In this case, since the shooting time and the shooting place (input number) are displayed on the corner of the picture recorded on the VTR in a superimposing fashion, the recorded picture of the entrance of the stranger can be searched for with ease.

If the alarm signal is supplied to any of the alarm input terminals 41 to 48 during, the monitoring is carried out in the separated form of the two systems. Only the system to which belongs the video input terminal (video camera) corresponding to such an alarm input terminal is set in the forced switching mode in which this video input terminal is selected by the change-over switch 2, while the operation in which the switching is continuously performed in the automatic switching mode is carried out in the other system. Accordingly, the place in which the stranger or the like is detected and the alarm signal is output is monitored by one monitor receiver with a priority, while the respective places are sequentially monitored in the automatic switching mode by the other monitor receiver. Thus, proper operations are carried out at every system.

By releasing the automatic switching mode, the switching operation corresponding to the operation of the input selecting switch 20 is carried out in a manual fashion.

While the supervisory video cameras are connected to all of the video input terminals 11 to 18 as described above, other video signal sources may be connected to these video input terminals 11 to 18. Further, while the video signal switching apparatus capable of performing the switching in the first system and the switching in the second system is described above, the switching may be performed in many more systems.

According to the above-mentioned embodiment of the present invention, the switching operation in the systems of two or more can be executed by the simple system arrangement utilizing the single video signal switching apparatus and hence a plurality of video signal switching apparatus need not be prepared.

Further, according to the embodiment of the present invention, when the switching operation in the systems of more than two systems is executed, then only the system to which the alarm signal is supplied performs the operation based on the alarm signal, thereby proper operations being performed for every systems.

Furthermore, as shown in FIG. 1, when time data is stored in the storage area of the timer time data of the storage area of the memory device 7, at the time stored in the storage area, setting data stored in the address indicated by the memory number data stored together with the time data is transferred to the storage area of the status data. Accordingly, at the time indicated by the timer time data, the CPU 1 sets a variety of control operations such as the switching operation or the like on the basis of the setting data transferred to the status data.

The timer device eight shown in FIG. 1 is designed to set the present time by means of the predetermined setting switch 6 mounted on the front panel of the video signal switching apparatus. More specifically, by operating the predetermined setting switch 6, the operation mode of the video signal switching apparatus is set to the time setting mode to thereby display the set time on the picture screen of the monitor receiver connected to the video signal switching apparatus. Thereafter, while watching the the set time displayed on the picture screen of the monitor receiver, the time of the timer device 8 is corrected as an accurate time by operating the predetermined setting switch 6 by the user.

The video signal switching apparatus of this embodiment has a timer function. That is, the RAM 7b has set therein a data storage area for this timer function. The data storage area for the timer function will be described below.

As shown in FIG. 4, the RAM 7b has prepared therein 100 bytes of a status data storage area in which setting condition of control operation done by the CPU 1 at present is stored. Eight sets of timer time data storage areas are prepared and accompanying storage address data of the setting state executed at the stored time timer is stored in each of the timer time data storage areas. Further, a total sum of 800 bytes of eight sets of areas in which various setting conditions are stored is prepared independently of the status data storage area.

When the timer function is executed by utilizing the data storage area, time and various setting situations are set by operating the setting switch 6. When the timer is set, data of setting situations are stored in any of eight sets of areas of the RAM 7b in which various setting conditions are stored under the control of the CPU 1. Also, data of operation time are stored in any of the timer time data storage areas and address data of the area in which the data of setting situations are stored, accompanying with the data of operation time. In this case, since eight sets of the storage areas are prepared, eight different operation conditions can be set one at a time.

After the operation conditions are set, when any time data stored in the timer time data storage areas becomes coincident with the present time data supplied from the timer device 8, the address data accompanying with the identical time data is judged, and the setting situation data stored in this address are transferred to the status storage area. Since the CPU 1 actuates the switching device on the basis of the data stored in the status storage area, the operation condition of the switching device is changed to the timer set by this data transfer.

Since the video signal switching apparatus can be operated in a timer-activated fashion as described above, the monitoring can be performed by the automatic switching only at night or the place to be monitored can be changed by the automatic switching operation at day and night. Alternatively, if a place where nobody stays during the night and unspecified persons go in and go out at day is to be monitored all day long, then the alarming operation is performed by the alarm signal from the infrared sensor only at nights in which nobody attends, while the alarming operation is not performed at days in which unspecified persons go in and go out even when a stranger is detected. Further, if the timer operation time is designated up to the date and day of the week, the monitoring can be performed in the alternative form on holidays or the like.

Figure 5:
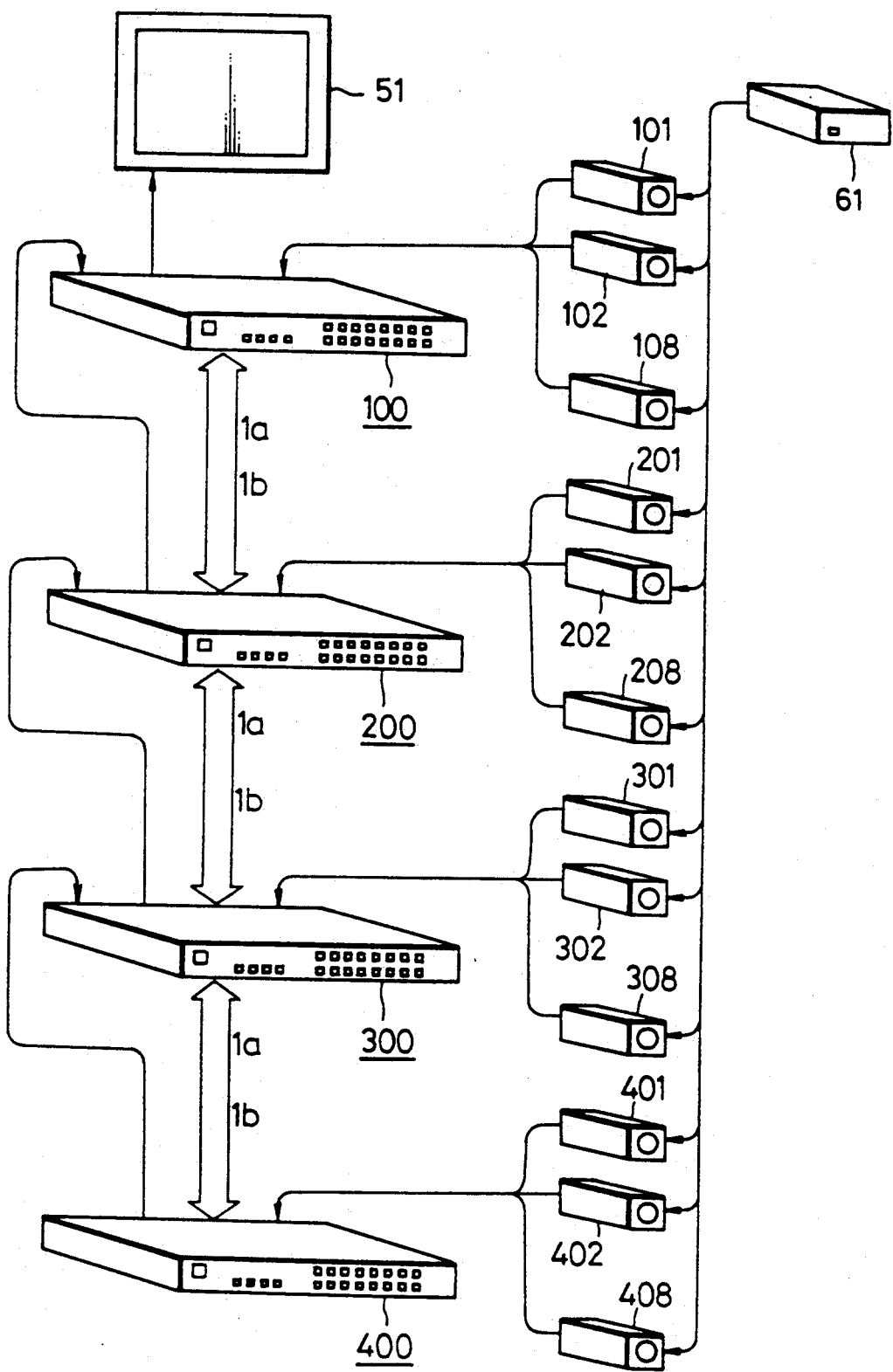
FIG. 5 is a schematic diagram used to explain operation of the video signal switching apparatus shown in FIG. 1.

Further, as shown in FIG. 5, the CPU 1 of this embodiment includes control data bus lines 1a, 1b for transmitting and receiving control data between other video signal switching apparatus and a computer, whereby control data are transmitted and received between it and appliances connected to the bus lines 1a, 1b.

Let us describe the case such that a plurality of video signal switching apparatus are connected by utilizing the bus lines 1a, 1b. Referring to FIG. 5, video signal switching apparatus are connected in series by utilizing the bus lines 1a and 1b. In FIG. 5, reference numerals 100, 200, 300 and 400 respectively depict first, second, third and fourth video signal switching apparatus and these four video signal switching apparatus 100 through 400 are arranged as shown in FIG. 1 and the same.

Then, by operating a predetermined key (or switch such as a DIP (dual inline package) switch and the like) constructing the setting switch 6 of the first video signal switching apparatus 100, the first video signal switching apparatus 100 is set to the master video signal switching apparatus. Connection terminals of the bus lines 1a of the video signal switching apparatus 100, 200 and 300 are connected to those of the bus lines 1b of the video signal switching apparatus 200, 300 and 400. Eight video cameras 101 to 108, 201 to 208, 301 to 308 and 401 to 408 are connected to the first to eighth video input terminals 11 to 18 of the video signal switching apparatus 100 through 400. That is, thirty-two video cameras in sum total are connected to the first to eighth video input terminals 11 to 18 of the video signal switching apparatus 100 to 400. In that case, a SYNC signal from the SYNC signal generator 61 is supplied to the video cameras 101 to 408 which can therefore take a picture at the same time on the basis of this SYNC signal. Therefore, the vertical SYNC signals of the video signals output from the video cameras 101 to 408 are arranged to have the same timing. This SYNC signal generator 61 includes a power supply circuit (not shown) and the video cameras 101 to 408 also are powered by the SYNC signal generator 61.

The video signal developed at the output terminal 4a of the fourth video signal switching apparatus 400 is supplied to the ninth video input terminal 19 of the third video signal switching apparatus 300. Similarly, the video signal developed at the output terminal 4a of the third video signal switching apparatus 300 is supplied to the ninth video input terminal 19 of the second video signal switching apparatus 200, and the video signal developed at the output terminal 4a of the second video signal switching apparatus 200 is supplied to the ninth video input terminal 19 of the first video signal switching apparatus 100. Then, the video signal developed at the output terminal 4a of the first video signal switching apparatus 100 is supplied to the monitor receiver 51. Alternatively, the monitor receiver 51 is replaced with the VTR (not shown).

While 32 video cameras are connected at maximum to the video switchers as shown in FIG. 5, in actual practice, the number of video cameras connected to the video signal switching apparatus can be selected in a range of less than thirty-two in accordance with the monitoring places or the like.

When a plurality of video signal switching apparatus 100 to 400 are connected in cascade as described above, the first video signal switching apparatus 100 connected to the monitor receiver 51 is set as the master video signal switching apparatus by operating its setting switch 6 and other video switchers 200 to 400 are automatically operated as slave video switchers in response to the command transmitted from the master video signal switching apparatus 100 via the bus lines 1a, 1b. That is, the CPU 1 in each video signal switching apparatus is designed so as to operate each video signal switching apparatus as the slave video signal switching apparatus in response to the command concerning the switching operation transmitted from other appliances via the bus line 1a or 1b. When the master video signal switching apparatus and the slave video signal switching apparatus are set as described above, then the following operations such as the switching operation or the like are effected under the control of the CPU 1 of the master video switcher 100 and the CPU 1 in each of the slave video signal switching apparatus carries out the switching operation corresponding to the command transmitted from the master video signal switching apparatus. In this case, the above-mentioned timer operation is carried out under the control of the master video signal switching apparatus 100 side and time and operable condition for effecting the timer operation are set in this master video signal switching apparatus 100.

The master video signal switching apparatus 100 determines on the basis of the answer for the command via the bus lines 1a, 1b that the corresponding slave video signal switching apparatus are connected to the video cameras, thus determining the number of the slave video signal switching apparatus connected thereto. Further, if the command is not transmitted from the master video signal switching apparatus any more, the respective video signal switching apparatus are operated by themselves.

If the number of the slave video signal switching apparatus connected to the master video signal switching apparatus is determined, then the first to eighth video input terminals 11 to 18 of the master video signal switching apparatus are set to the input numbers 1 to eight and also the first to eighth video input terminals 11 to 18 of the respective slave video signal switching apparatus 200, 300 and 400 are automatically allocated to the input numbers 9 to 16, 17 to 24 and 25 to 32. When the input switching operation is performed, the allocated input number is superimposed on the picture on the picture screen by the superimposing circuit 3 of the master video signal switching apparatus 100 and is thereby displayed on the monitor receiver 51.

When each of the video signal switching apparatus is operated solely without being connected in plural form, the first to eighth video input terminals 11 to 18 are set to the input numbers 1 to 8, respectively.

Operation in which a plurality of video signal switching apparatus are connected as shown in FIG. 5 will be described below. In this case, let it be assumed that the automatic mode in which the switching is automatically carried out at every second is selected by operating the setting switch 6 of the master video switcher 100. At that time, the CPU 1 of the master video switcher 100 determines the status of the active switches 30 of the respective video signal switching apparatus 100 through 400 to thereby determine the video cameras which are placed in the active state by the active switches 30.

When all video cameras, for example, are set in the active state, then the video signals from the video cameras 101 to 408 connected to all video signal switching apparatus 100 to 400 are sequentially supplied from the output terminal 4a to the monitor receiver 51. More specifically, the change-over switch 2 is changed in position in such a fashion that the video signal from the video camera 101 connected to the first video input terminal 11 of the first video signal switching apparatus 100 is delivered from the output terminal 4a. At that time, the input selection switch 20 corresponding to the video camera 101 is energized. If one second has passed since the video signal from the video camera 101 is output, then the change-over switch 2 is changed in position in such a manner that the video signal from the video camera 102 connected to the second video input terminal 12 of the first video signal switching apparatus 100 is delivered from the output terminal 4a. At that time, the input selection switch 20 corresponding to the video camera 102 is energized. Similarly, the change-over switch 2 is hereinafter changed in position such that the video signals from the video cameras 103, 104, ..., 108 are delivered from the output terminal 4a at every second and the input selection switch 20 is energized in response to each switching operation. In this way, the video signals from the eight video cameras 101 to 108 are selectively delivered from the output terminal 4a at every second, and the pictures of the respective video signals from the video cameras 101 to 108 are displayed on the monitor receiver 51 respectively at every second.

If one second has passed since the video signal from the video camera 108 has been output from the output terminal 4a, the ninth video input terminal 19 is selected by the change-over switch 2 of the first video signal switching apparatus 100. Also, by the command issued from the CPU 1 of the master (first) video signal switching apparatus 100, the change-over switch 2 of the second video signal switching apparatus 200 is changed in position such that the video signal from the video camera 201 connected to the first video input terminal 11 is delivered from the output terminal 4a. At that time, the input selection switch 20 of the second video signal switching apparatus 200 corresponding to the video camera 201 is energized.

Thus, the video signal from the video camera 201 is supplied from the output terminal 4a of the second video signal switching apparatus 200 to the ninth video input terminal 19 of the first video signal switching apparatus 100 and further supplied to the output terminal 4a of the first video switcher 100 from the ninth video input terminal 19 through the change-over switch 2, whereby a picture of the video signal from the video camera 201 is displayed on the monitor receiver 51 connected to the output terminal 4a of the first video signal switching apparatus 100.

When one second has passed since the video signal from the video camera 201 has been output from the output terminal 4a of the first video signal switching apparatus 100, then the change-over switch 2 of the first video signal switching apparatus 100 is not changed in position and the change-over switch 2 of the second video signal switching apparatus 200 is changed in position such that the video signal from the video camera 202 is delivered from its output terminal 4a. At that time, the input selection switch 20 of the second video signal switching apparatus 200 corresponding to the video camera 202 is energized. In a like manner, the change-over switch 2 is hereinafter changed in position such that the video signals from the video cameras 203, 204, ... , 208 are delivered from the output terminal 4a at every second, thereby the corresponding input selection switches 20 being energized in response to each switching operation. As described above, the video signals from the eight video cameras 201 to 208 are selectively delivered from the output terminal 4a of the second video signal switching apparatus 200 and from the output terminal 4a of the first video signal switching apparatus 100 at every second so that, after the video signals from the video cameras 101 to 108 are displayed on the monitor receiver 51, the video signals from the video cameras 201 to 208 are sequentially displayed on the monitor receiver 51 at every second.

If one second has passed since the video signal from the video camera 208 has been output from the output terminal 4a, then the ninth video input terminal 19 is selected by the change-over switch 2 of the first video signal switching apparatus 100. Also, the change-over switch 2 of the second video signal switching apparatus 200 is changed in position by the command issued from the CPU 1 of the master (first) video switcher 100 in such a fashion that the video signal from the video camera 201 connected to the first video input terminal 11 is delivered from the output terminal 4a and further the change-over switch of the third video signal switching apparatus 300 is changed in position in such a manner that the video signal from the video camera 301 connected to the first video input terminal 11 is delivered from the output terminal 4a. At that time, the input selection switch 20 of the third video signal switching apparatus 300 corresponding to the video camera 301 is energized.

Thus, the video signal from the video camera 301 is supplied from the output terminal 4a of the third video signal switching apparatus 300 to the ninth video input terminal 19 of the second video signal switching apparatus 200, supplied to the output terminal 4a of the second video signal switching apparatus 200 from the ninth video input terminal 19 through the change-over switch 2, supplied from the output terminal 4a to the ninth video input terminal 19 of the first video signal switching apparatus 100 and further supplied from the ninth video input terminal 19 to the output terminal 4a of the first video signal switching apparatus 100 through the change-over switch 2, thereby the picture of the video signal from the video camera 301 being displayed on the monitor receiver 51 connected to the output terminal 4a.

After one second has passed since the video signal from the video camera 301 has been delivered from the output terminal 4a of the first video signal switching apparatus 100, the change-over switches 2 of the first and second video signal switching apparatus 100 and 200 are not changed in position and the change-over switch 2 of the third video signal switching apparatus 300 is changed in position in such a fashion that the video signal from the video camera 302 is delivered from its output terminal 4a. At that time, the input selection switch 20 of the third video signal switching apparatus 300 corresponding to the video camera 302 is energized. In a like manner, the change-over switches 2 are similarly changed in position such that the video signals from the video cameras 303, 304, ... , 308 are delivered from the output terminal 4a, and the corresponding input selection switches 20 are energized each time. In this way, the video signals from the eight video cameras 301 to 308 are selectively delivered from the output terminal 4a of the first video signal switching apparatus 100 at every second so that, after the video signals from the video cameras 101 through 108 and 201 through 208 are displayed on the monitor receiver 51, the pictures of the video signals from the video cameras 301 through 308 are sequentially displayed on the monitor receiver 51 at every second.

After one second has passed since the video signal from the video camera 308 has been delivered from the output terminal 4a, the ninth video input terminal 19 is selected by the change-over switch 2 of the first video signal switching apparatus 100 and the ninth video input terminal 19 is selected by the change-over switches 2 of the second and third video signal switching apparatus 200 and 300 in response to the command from the CPU 1 of the master (first) video signal switching apparatus 100. Further, the change-over switch 2 of the fourth video switcher 400 is changed in position in such a manner that the video signal from the video camera 401 connected to the first video input terminal 11 is delivered from the output terminal 4a. At that time, the input selection switch 20 of the fourth video switcher 400 corresponding to the video camera 401 is energized.

Thus, the video signal from the video camera 401 is supplied from the output terminal 4a of the fourth video signal switching apparatus 400 to the ninth video input terminal 19 of the third video signal switching apparatus 300, supplied to the output terminal 4 of the third video switcher 300 from the ninth video input terminal 19 through the change-over switch 2, supplied to the ninth video input terminal 19 of the second video signal switching apparatus 200 from this output terminal 4a, supplied to the output terminal 4a of the second video signal switching apparatus 200 from the ninth video input terminal 19 through the change-over switch 2, supplied to the ninth video input terminal 19 of the first video signal switching apparatus 100 from the output terminal 4a, and further supplied to the output terminal 4a of the first video switcher 100 from the ninth video input terminal 19 through the change-over switch 2, thereby the picture of the video signal from the video camera 201 being displayed on the monitor receiver 51 connected to the output terminal 4a.

After one second has passed since the video signal from the video camera 401 has been delivered from the output terminal 4a of the first video signal switching apparatus 100, the change-over switches 2 of the first, second and third video signal switching apparatus 100, 200 and 300 are not changed in position and the change-over switch 2 of the fourth video signal switching apparatus 400 is changed in position in such a manner that the video signal from the video camera 402 is delivered from the output terminal 4a. At that time, the input selection switch 20 of the third video signal switching apparatus 400 corresponding to the video camera 402 is energized. Similarly, the change-over switches 2 are hereinafter changed in position so that the video signals from the video cameras 403, 404, ..., 408 are delivered from the output terminals 4a at every second, and the corresponding input selection switches 20 are energized in response to the respective switching operations. In this way, the video signals from the eight video cameras 401 to 408 are selectively delivered at every second from the output terminal of the first video signal switching apparatus 400 so that, after the video signals from the video cameras 101 through 108, 201 through 208 and 301 through 308 are displayed on the monitor receiver 51, the pictures of the video signals from the video cameras 401 through 408 are sequentially displayed on the monitor receiver 51 at every second.

After one second has passed since the video signal from the video camera 408 has been delivered from the output terminal 4a, the change-over switch 2 of the first video signal switching apparatus 100 is changed in position such that the video signal from the video camera 101 connected to the first video input terminal 11 of the first video signal switching apparatus 100 is delivered from the output terminal 4a. Hereinafter, the change-over switches 2 are repeatedly changed in position so that the video signals from the video cameras 101, 102, ... are delivered from the output terminals 4a in the above-mentioned order.

As described above, the video signals from the respective video cameras 101 through 108, 201 through 208, 301 through 308 and 401 through 408 are sequentially supplied to the monitor receiver 51 at every second and displayed on this monitor receiver 51 during one second each. In this case, when eight video cameras are connected to each of all video signal switching apparatus 100 through 400, pictures of video signals from thirty-two video cameras in total are displayed on the monitor receiver 51 during one second each at the cycle of thirty-two seconds. Accordingly, thirty-two places can be monitored by means of the single monitor receiver 51 (or VTR) so that many places can be monitored satisfactorily by the monitor system composed of less appliances.

When the monitoring is performed by this video signal switching apparatus, then the video camera (input terminal) whose picture is displayed can be determined by the energized state of the input selecting switch 20 of each video signal switching apparatus. Also, the input number is displayed on the corner of the picture displayed on the monitor receiver 51 by superimposing the character data of the input number by the superimposing circuit 3 and the displayed picture of the video camera can be determined by the display of this input number. Accordingly, when the pictures switched by the video switching apparatus 100 to 400 are recorded by the VTR, if the places to be monitored cannot be determined only by the pictures because the monitored places are substantially the same, then the monitoring place of the picture recorded can be determined by the display of this input number. In this case, since the character data of time also is superimposed upon the picture together with the display of the input number, the time at which the picture is recorded by the VTR can be determined.

If any of the input selecting switch 20 is depressed in the automatic switching mode, then the picture is switched to the picture of the video signal applied to the video input terminal of the input number corresponding to the depressed input selection switch 20. Then, if the same input selection switch 20 is depressed again, the video signal switching apparatus is returned to the automatic switching mode in which the switching is performed again at every predetermined time. Accordingly, when the monitoring is performed in the automatic switching mode, a particular place can be temporarily monitored with a priority.

If there is a place which need not be monitored, then the picture from the video camera corresponding to the unnecessary place is inhibited from being displayed by setting the active switch 30 corresponding to the above camera in the non-active state, which is very suitable for the case such that the monitoring place is changed depending, for example, on time. In this case, it is possible that a video camera which is placed in the non-active state at a predetermined time by the timer-activated function is set previously, which is considerably useful.

When the alarm signal is supplied to any of the alarm input terminals 41 to 48 of the video signal switching apparatus in the automatic switching mode, then the automatic switching operation is temporarily stopped and the video signal from the video camera corresponding to the terminal number of the terminal to which the alarm signal is supplied is selected and output by the change-over switch 2. Also, the number of the terminal to which the alarm signal is supplied and the time data thereof are stored in the RAM 7b. Further, depending upon the set operation mode, an alarm sound is emanated from the speaker during a predetermined time and an alarm lamp is blinked during a predetermined time. Accordingly, if the infrared sensors are located, for example, at respective monitoring places and the alarm signals from these infrared sensors are supplied to the alarm input terminals 41 to 48 of each video signal switching apparatus, then a picture of the monitoring place entered by the stranger is displayed on the monitor receiver 51 and the entrance of the stranger also is alarmed by the alarming circuit 9. Thus, even when any stranger enters the monitoring place during the picture of other monitoring place is displayed, then the stranger cannot be undetected and the monitoring can be carried out reliably. Further, if the monitoring is not carried out in a real time fashion by the monitor receiver 51 and if the places or the like are monitored at night by the VTR in an automated fashion, the stranger entered the monitoring place can be determined later by data (data of place and time in which the stranger enters) stored in the memory device 7. In this case, since the shooting time and shooting place (input number) are superimposed upon the picture recorded by the VTR, the recorded picture of the stranger can be found with ease.

If the automatic switching mode is released, then the switching operation can be carried out in a manual fashion corresponding to the operation of the input selecting switch 20.

As described above, according to the video signal switching apparatus of this embodiment, when a plurality of video signal switching apparatus are connected, then they are automatically switched in unison with one another. Accordingly, although only eight video cameras are connected by the use of a single video signal switching apparatus, thirty-two video cameras can be connected by the use of, for example, four video signal switching apparatus and the pictures of the respective video cameras can be monitored. In this case, since the monitoring conditions can be automatically changed with time by the timer function, many monitoring places can be constantly monitored properly in any situations.

While the supervisory video cameras are connected to all of the video input terminals 11 to 19 as described above, other video signal sources may be connected to these video input terminals 11 to 19.

Furthermore, the monitoring condition can automatically be changed with time by the timer function as described above so that, even when the supervisory system is effected at night in an automated fashion, the proper monitoring can constantly be carried out in any situations.

Having described the preferred embodiment of the invention with reference to the accompanying drawings, it is to be understood that the invention is not limited to that precise embodiment and that various changes and modifications thereof could be effected by one skilled in the art without departing from the spirit or scope of the invention as defined in the appended claims.

What is claimed is:

1. A video signal switching apparatus having a change-over switch for selectively outputting video signals supplied from a plurality of video signal sources, comprising:
    (a) mode setting means for selectively outputting a signal indicative of a first mode in which a plurality of video signals supplied from said plurality of video signal sources are sequentially output in accordance with a predetermined order and a signal indicative of a second mode in which a plurality of video signals supplied from said plurality of video signal sources are divided into first and second groups and a plurality of video signals within each of the divided groups are sequentially output in accordance with a predetermined order;
    (b) memory means for storing data indicating the predetermined output order of said plurality of video signals; and
    (c) control means for controlling said change-over switch on the basis of an output signal of said mode setting means and an output signal of said memory means, wherein said control means controls said change-over switch such that, when said signal indicative of the first mode is supplied thereto from said mode setting means, a plurality of video signals supplied from said plurality of video signal sources to first and second input terminal groups of said change-over switch are sequentially output in accordance with said predetermined output order and that, when said signal indicative of the second mode is supplied thereto from said mode setting means, video signals supplied to said first input terminal groups of said change-over switch from said plurality of video signal sources are sequentially output in accordance with said predetermined output order and simultaneously video signals supplied to said second input terminal groups of said change-over switch from said plurality of video signal sources are sequentially output in accordance with said predetermined output order.

2. A video signal switching apparatus for selectively outputting video signals supplied from a plurality of video signal sources, comprising:
    (a) a change-over switch having first and second input terminal groups and first and second output terminal groups;
    (b) mode setting means for selectively outputting a signal indicative of a first mode in which a plurality of video signals supplied from said plurality of video signal sources are sequentially output in accordance with a predetermined order and a signal indicative of a second mode in which a plurality of video signals supplied from said plurality of video signal sources are divided into first and second groups and a plurality of video signals within each of the divided groups are sequentially output in accordance with a predetermined order;
    (c) memory means for storing data indicating the predetermined output order of said plurality of video signals; and
    (d) control means for controlling said change-over switch on the basis of an output signal of said mode setting means and an output signal of said memory means, wherein said control means controls said change-over switch such that, when said signal indicative of the first mode is supplied thereto from said mode setting means, a plurality of video signals supplied from said plurality of video signal sources to said first and second input terminal groups of said change-over switch are sequentially output from said first and second output terminals in accordance with said predetermined output order and that, when said signal indicative of the second mode is supplied thereto from said mode setting means, video signals supplied to said first input terminal groups of said change-over switch from said plurality of video signal sources are sequentially output from said first output terminal in accordance with said predetermined output order and simultaneously video signals supplied to said second input terminal groups of said change-over switch from said plurality of video signal sources are sequentially output from said second output terminal in accordance with said predetermined output order, output video signals from said first and second output terminals being respectively supplied to first and second monitor receivers.

3. A video signal switching apparatus for selectively outputting video signals supplied from a plurality of video signal sources, comprising:
    (a) a change-over switch having a first input terminal group, a second input terminal group, a first alarm input terminal group corresponding to said first input terminal group, a second alarm input terminal group corresponding to said second input terminal group, a first output terminal and a second output terminal;
(b) mode setting means for selectively outputting a signal indicative of a first mode in which a plurality of video signals supplied from said plurality of video signal sources are sequentially output in accordance with a predetermined order and a signal indicative of a second mode in which a plurality of video signals supplied from said plurality of video signal sources are divided into first and second groups and a plurality of video signals within each of the divided groups are sequentially output in accordance with a predetermined order;
(c) memory means for storing data indicating the predetermined output order of said plurality of video signals;
(d) detecting means for detecting from said first and second alarm input terminal groups the alarm input terminal to which an alarm signal is supplied;
(e) control means for controlling said change-over switch on the basis of an output signal of said mode setting means and an output signal of said memory means, wherein said control means controls said change-over switch such that, when said signal indicative of the first mode is supplied thereto from said mode setting means, a plurality of video signals supplied from said plurality of video signal sources to said first and second input terminal groups of said change-over switch are sequentially output from said first and second output terminals in accordance with said predetermined output order and that, when said signal indicative of the second mode is supplied thereto from said mode setting means, video signals supplied to said first input terminal groups of said change-over switch from said plurality of video signal sources are sequentially output from said first output terminal in accordance with said predetermined output order and simultaneously video signals supplied to said second input terminal groups of said change-over switch from said plurality of video signal sources are sequentially output from said second output terminal in accordance with said predetermined output order; and
(f) second control means for controlling said change-over switch on the basis of a detected result of said detecting means such that a video signal supplied to an input terminal corresponding to the alarm input terminal to which said alarm signal is input is successively output from said first or second output terminal.

4. A video signal switching apparatus having a change-over switch for selectively outputting video signals supplied from a plurality of video signal sources, comprising:
(a) mode setting means for selectively outputting a signal indicative of a first mode in which a plurality of video signals supplied from said plurality of video signal sources are sequentially output in accordance with a predetermined order and a signal indicative of a second mode in which a plurality of video signals supplied from said plurality of video signal sources are divided into first and second groups and a plurality of video signals within each of the divided groups are sequentially output in accordance with a predetermined order;
(b) memory means for storing data indicating a desired output order of said plurality of video signals at an address designated at each time; and
(c) control means for controlling said change-over switch on the basis of an output signal of said mode setting means and data indicative of output order and read out from an address of said memory means in response to its time lapse, wherein said control means controls said change-over switch such that, when said signal indicative of the first mode is supplied thereto from said mode setting means, a plurality of video signals supplied from said plurality of video signal sources to said first and second input terminal groups of said change-over switch are sequentially output in accordance with said predetermined output order and that, when said signal indicative of the second mode is supplied thereto from said mode setting means, video signals supplied to said first input terminal groups of said change-over switch from said plurality of video signal sources are sequentially output in accordance with said predetermined output order and simultaneously video signals supplied to said second input terminal groups of said change-over switch from said plurality of video signal sources are sequentially output in accordance with said predetermined output order.

* * * * *